(12) United States Patent
Krishnamurthy et al.

(10) Patent No.: US 7,167,308 B1
(45) Date of Patent: Jan. 23, 2007

(54) SYSTEM FOR ELIMINATING SECONDARY IMAGES IN REAR PROJECTION SYSTEMS

(75) Inventors: Sushil Krishnamurthy, Sunnyvale, CA (US); Michael H. Kalmanash, Precott, AZ (US); Gayathri Sundaresan, Sunnyvale, CA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 80 days.

(21) Appl. No.: 11/075,583

(22) Filed: Mar. 9, 2005

(51) Int. Cl.
  *G03B 21/60* (2006.01)
  *G02B 5/30* (2006.01)
  *G02B 3/08* (2006.01)

(52) U.S. Cl. .................. 359/457; 359/487; 359/493; 359/742

(58) Field of Classification Search .......... 359/15, 359/454–457, 483, 487, 493, 599, 742
See application file for complete search history.

(56) References Cited

U.S. PATENT DOCUMENTS

| | | |
|---|---|---|
| 2,378,252 A | 6/1945 | Staehle |
| 4,083,626 A | 4/1978 | Miyahara |
| 4,116,911 A | 9/1978 | Miyahara |
| 4,895,429 A | 1/1990 | Iwahara |
| 5,146,365 A | 9/1992 | Minoura |
| 5,307,205 A | 4/1994 | Ludwig |
| 5,448,401 A | 9/1995 | Takuma |
| 5,477,380 A | 12/1995 | Watanabe |
| 5,563,738 A | 10/1996 | Vance |
| 5,581,407 A | 12/1996 | Mitani |
| 5,694,245 A | 12/1997 | Goto |
| 6,151,162 A | 11/2000 | Van De Ven |
| 6,163,402 A | 12/2000 | Chou |
| 6,262,841 B1 * | 7/2001 | Dike .................... 359/483 |
| 6,307,675 B1 | 10/2001 | Abe |
| 6,327,083 B1 | 12/2001 | Goldenberg |
| 6,407,859 B1 | 6/2002 | Hennen |
| 6,414,789 B2 | 7/2002 | Braun |
| 6,449,089 B1 | 9/2002 | Moshrefzadeh |
| 6,466,368 B1 | 10/2002 | Piepel |
| 6,483,612 B2 | 11/2002 | Walker |
| 6,519,087 B2 | 2/2003 | Moshrefzadeh |

(Continued)

*Primary Examiner*—Loha Ben
*Assistant Examiner*—Jack Dinh
(74) *Attorney, Agent, or Firm*—Nathan O. Jensen; Kyle Eppele

(57) ABSTRACT

A secondary image suppression system (SISS) for minimizing secondary ghost images in a screen assembly for a rear projection system. The secondary image suppression system includes a circular polarizing assembly positioned to receive light from a rear projection lens of a rear projection system. The circular polarizing assembly includes a linear polarizer and a quarter wave retarder. The linear polarizer and the quarter wave retarder are serially positioned relative to each other and are assembled with a high power Fresnel lens using index matching media such that internal reflections are minimized. The high power Fresnel lens is positioned to receive output from the circular polarizing assembly. During use, light from a projection lens of a rear projection system is introduced through the circular polarizing assembly and through the high power Fresnel lens toward a viewing screen. Any significant secondary ghost images are eliminated by the circular polarizing assembly. The SISS may be combined with a high contrast screen assembly to improve high ambient contrast while avoiding the necessity for beaded films or other structured screens that could cause viewing artifacts.

19 Claims, 5 Drawing Sheets

U.S. PATENT DOCUMENTS

| | | |
|---|---|---|
| 6,636,355 B2 | 10/2003 | Moshrefzadeh |
| 6,710,941 B2 | 3/2004 | Hennen |
| 6,714,327 B1 | 3/2004 | Abersfelder |
| 6,717,626 B1 | 4/2004 | Kondo |
| 6,768,566 B2 | 7/2004 | Walker |
| 6,987,624 B2 * | 1/2006 | Watanabe et al. ............ 359/742 |
| 2001/0001582 A1 | 5/2001 | Walker |
| 2002/0154401 A1 | 10/2002 | Hennen |
| 2002/0159109 A1 | 10/2002 | Walker |

* cited by examiner

SYSTEM FOR ELIMINATING SECONDARY IMAGES IN REAR PROJECTION SYSTEMS

BACKGROUND OF THE INVENTION

1. Field of the Invention

The present invention relates to screen assemblies for rear projection systems and more particularly to minimizing secondary ghost images and providing enhanced contrast.

2. Description of the Related Art

Recently low profile (thin) microdisplay-based rear projection monitors and digital televisions have been developed. A Fresnel lens is typically used behind the viewing screen for rear projection systems. The purpose of the Fresnel lens is to "collimate" the light rays incident from the projection lens, in order to minimize luminance nonuniformities near the edges of the display. The Fresnel lens is comprised of a series of concentric facets which become increasingly steep towards the edges of the display, providing the increased refraction necessary for "collimation". Additionally, many rear projection applications require minimal depth, for space and weight savings. As the distance from the projection lens to the screen decreases, the angles of incidence of the projected rays approaching the edges of the screen correspondingly increase for a given screen size, increasing the required "power" of the Fresnel lens (reducing its f/number) in order to provide the needed light steering to achieve collimation of the off-axis rays. This increases the steepness of the facets and can cause undesirable artifacts, namely secondary/ghost images, which are present along with the primary projected image. As will be disclosed below, the present invention discloses ways to integrate a viewing screen with a short focal length Fresnel lens in a durable assembly, to suppress these ghost images.

U.S. Pat. No. 6,483,612 (US20010001582), U.S. Pat. No. 6,768,566 (US 20020159109), and each entitled "Projection Screen Apparatus Including Holographic Optical Element" and each issued to D. S. Walker, disclose a screen apparatus that includes a holographic optical element and a diffuser. The holographic optical element may be constructed using standard techniques known in the field of holography. The holographic optical element may be used to replace a typical Fresnel lens used in projection screen apparatuses. In operation, the holographic optical element receives image light from an image engine or projector and redirects the image light to the diffuser for scattering. The holographic optical element can be designed to substantially collimate, converge, or diverge the image light. The combination of the holographic optical element and the diffuser provides improved illumination uniformity that can be perceived by a viewer as the viewer moves in directions transverse to the screen apparatus. The screen apparatus may be designed to provide improved illumination uniformity to optimized or optimal locations in a viewing region. The screen apparatus may be advantageously employed in display apparatuses. Some of the disadvantages of this approach are (i) holograms are typically prone to speckle which is distracting to the viewer (ii) the efficiency of the hologram is compromised somewhat at extreme angles (iii) for short throw (low f/#) systems this approach would be prone to ghosting as well and (iv) the engineering/setup costs are higher versus conventional approaches using the Fresnel lens.

U.S. Pat. No. 6,710,941 (20020154401) and U.S. Pat. No. 6,407,859, each entitled "Fresnel Lens For Projection Screens" and each issued to D. W. Hennen et al, disclose a screen, such as is used in back-lit projection screens, having a Fresnel lens laminated to another layer for support. The screen includes a Fresnel lens having an output surface, and a dispersing screen supportingly attached on a first side to the output surface of the Fresnel lens. The main disadvantage of this approach is that a portion of the "active" facets responsible for the actual light refraction/bending is not available as it is used up in supporting the Fresnel lens. Furthermore, while this approach is intending to get the Fresnel lens as close to the screen as possible to minimize ghosting, the present invention, as will be disclosed below, achieves the same result but is not subject to these limitations. More specifically, the screen can be separated from the Fresnel lens and still be free of ghosting since the ghost reflections have been "locally" suppressed in the modified Fresnel subassembly.

Many applications require the screen to be viewed in high ambient lighting, where incident illumination reflected from the screen can lower contrast and make the display hard to read. Often, high contrast beaded screens are utilized with these high ambient viewing situations because they have low reflectivity and relatively high transmittance. Such screens are described in U.S. Pat. No. 2,378,252, entitled "Projection Screen", and issued to H. C. Staehle, et al., and in U.S. Pat. No. 55,563,738, entitled "Light Transmitting and Dispersing Filter Having Low Reflectance", issued to D. W. Vance. In systems utilizing such screens, a Fresnel lens collimates the projection lens output. This light is then refracted by the beads and exits through small apertures on the viewer side. The incident ambient is largely absorbed by the black resin, resulting in excellent high ambient contrast. Regardless of bead size, the screen structure is visible and can be objectionable to the viewer (grain). Additionally, imperfect beads create bright spots which vary as the viewer's head position is changed (scintillation). As will be disclosed below, the current invention minimizes the visual artifacts and provides superior high ambient contrast.

There have been other attempts to provide high contrast rear projection screens. For example, U.S. Pat. No. 6,449,089 B1 entitled "Rear Projection Screen with Enhanced Contrast" discloses projection screen assemblies that include one or more birefringent retarding layers and one or more polarizing layers. The retarding and polarizing layers reduce the unwanted reflection of ambient and image light. Embodiments show utilization of a serial arrangement of a dispersing (i.e. diffusing) layer substrate, a quarter wave retarder, and a linear polarizer for contrast enhancement. However, the '089 screen assemblies do not include implementations to mitigate ghosts observed in certain rear projection systems. This is especially applicable to systems which are thin, demanding the use of a high power Fresnel lens which is prone to ghost generation.

Other attempts to provide high contrast screens include U.S. Pat. No. 6,519,087, entitled "Rear Projection Screen Incorporating Diffuser", issued to R Moshrefzadeh. In this invention a diffuser is added to a beaded screen to mask the appearance of grain. The drawbacks to this approach are that system resolution is degraded by the diffuser, and screen reflectance is increased. Another approach is described in U.S. Pat. No. 6,636,355B2, entitled "Microstructured Rear Projection Screen" and issued to R. Moshrefzadeh et al. A drawback of this approach is that virtually any structure is visible when the screen is viewed from a short distance, as would be the case in vehicular applications, or desktop or medical applications, to name a few.

SUMMARY OF THE INVENTION

In one broad aspect, the present invention is a secondary image suppression system for minimizing secondary ghost images in a screen assembly for a rear projection system. The secondary image suppression system includes a circular polarizing assembly positioned to receive light from a rear projection lens of a rear projection system. The circular polarizing assembly includes a linear polarizer and a quarter wave retarder. The linear polarizer and the quarter wave retarder are serially positioned relative to each other and are assembled with a high power Fresnel lens using index matching media such that internal reflections are minimized. The high power Fresnel lens is positioned to receive output from the circular polarizing assembly. During use, light from a projection lens of a rear projection system is introduced through the circular polarizing assembly and through the high power Fresnel lens toward a viewing screen. Any significant secondary ghost images are eliminated by the circular polarizing assembly.

In another broad aspect, the present invention is embodied as a high contrast screen assembly for a rear projection system. In one embodiment of the high contrast screen assembly, the secondary image suppression system (SISS) is provided that includes a first SISS quarter wave retarder, an SISS linear polarizer and a second SISS quarter wave retarder. A high contrast viewing screen assembly is operatively associated with the secondary image suppression system. The high contrast viewing screen assembly includes a holographic pre-diffuser for receiving the light output from the high power Fresnel lens. The pre-diffuser is for minimizing speckle. A holographic diffuser receives light output from the holographic pre-diffuser. A high contrast quarter wave retarder (HCQWR) receives light output from the holographic diffuser. A high contrast linear polarizer (HCLP) receives light output from the HCQWR. During use circularly polarized light from the Fresnel lens is introduced to the pre-diffuser for minimizing speckle, passed through the diffuser which forms the desired viewing cone for an observer while preserving the polarization of the light, passed through the HCQWR for linearly polarizing the light, and passed through the HCLP as it exits the high contrast screen assembly. Incident ambient light is linearly polarized on first passing through the HCLP, circularly polarized by the HCQWR, and upon partial reflection from the holographic diffuser and the holographic pre-diffuser the state of polarization is reversed and after passing back through the HCQWR is converted back to linearly polarized light, but with its axis normal to that of the HCLP, thus being effectively absorbed by the HCLP.

In this way high ambient contrast is improved while avoiding the necessity for beaded films or other structured screens that could cause viewing artifacts.

Other arrangements of the components in the SISS with suitable arrangement of components in the high contrast viewing screen assembly can be provided as disclosed below. These variations in the SISS and high contrast screen assembly are geared towards handling different polarization states of energy coming out of the projection resulting in enhanced system throughput while achieving ghost suppression and providing high ambient contrast.

BRIEF DESCRIPTION OF THE DRAWINGS

The same elements or parts throughout the figures of the drawings are designated by the same reference characters.

DETAILED DESCRIPTION OF THE INVENTION

Figure 1:
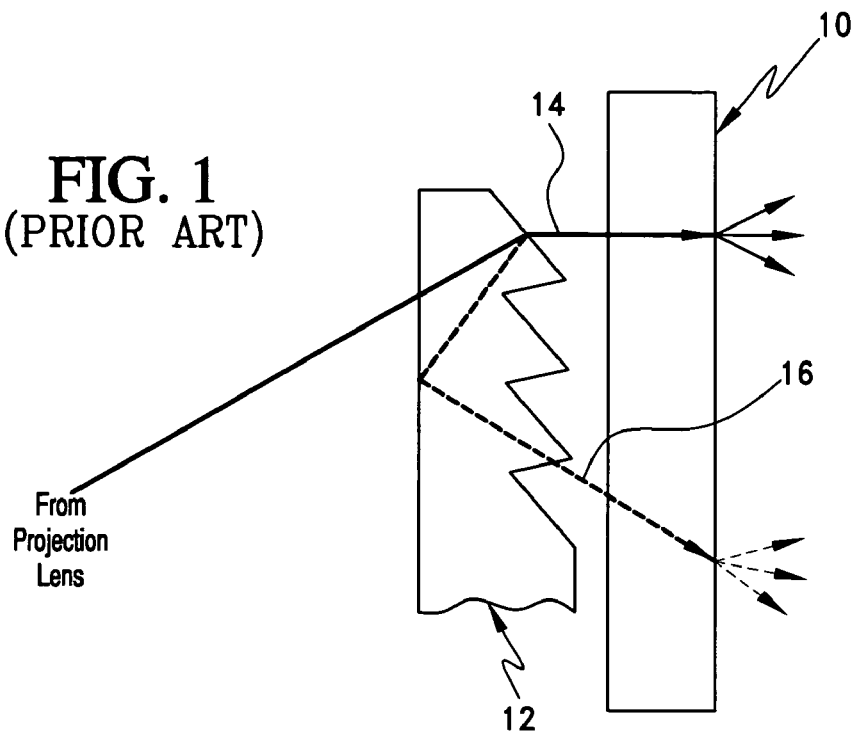
FIG. 1 (Prior Art) is a schematic representation of a screen assembly for a conventional rear projection system illustrating the origin of secondary ghost images.

Referring now to the drawings and the characters of reference marked thereon, FIG. 1 (Prior Art) illustrates a conventional rear projection screen assembly that includes a viewing screen 10 and a Fresnel lens 12. The desired primary image forming rays are shown as solid arrows 14 while the secondary (ghost) image forming rays are shown as dashed arrows 16. Both of these reach the screen 10, and as a result the viewer sees the desired primary and the undesired secondary images. Only one such secondary image forming case is shown in FIG. 1, but in actual practice, multiple secondary images are seen, arising from different pathways. The ghost images begin some distance from the screen center, where the Fresnel facets are steep enough that the reflection of incident rays is appreciable, and where such reflected rays impinge onto the rear (piano) surface of the Fresnel lens at an angle (with respect to normal) sufficiently high that significant or total internal reflection (TIR) occurs at the rear (piano) surface of the Fresnel. The re-reflected rays then exit the Fresnel lens physically displaced from the rays forming the primary image. This effect is present in all systems incorporating Fresnel lenses, but its magnitude increases as the Fresnel f/# is reduced. The sensitivity to ghost images is a function of the end-application. For demanding data projectors, objectionable ghosts might be expected with f/4 or lower, while low profile (thin) projectors may require f/# below f/1. Typically, the primary rays are nominally normally incident on the screen 10 while the secondary rays are incident at an oblique angle (converging). As a result, the secondary images are physically separated from the primary image, causing distracting ghost images.

Figure 2:
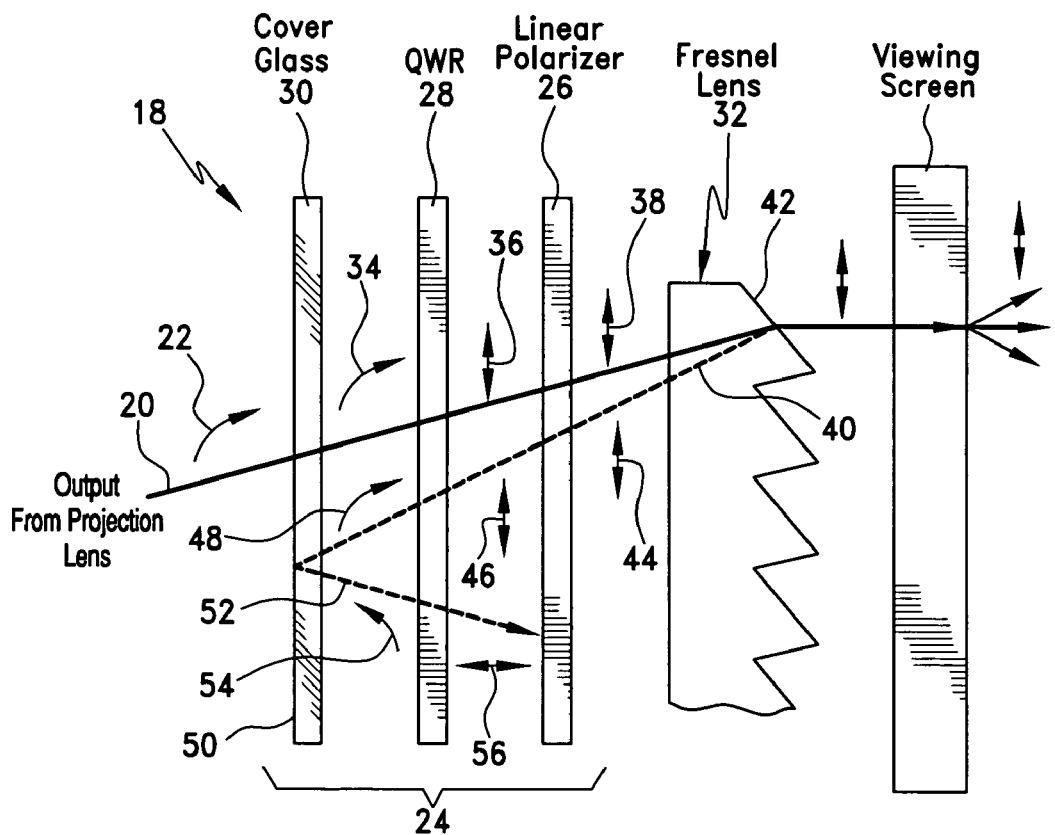
FIG. 2 is a schematic illustration of a secondary image suppression system in accordance with a first embodiment of the present invention in which the output from the projection lens is circularly polarized.

Referring now to FIG. 2, a first embodiment of the secondary image suppression system of the present invention is illustrated, designated generally as 18, in which the output 20 from a projection lens (not shown) of a rear projection system is circularly polarized, as indicated by arrow 22. The secondary image suppression system 18 includes a circular polarizing assembly, designated generally as 24, positioned to receive the light 20 from the rear projection lens. The circular polarizing assembly 24 includes a linear polarizer 26, a quarter wave retarder (i.e. quarter wave plate) 28, and a support substrate 30. The linear polarizer 26 and the quarter wave retarder 28 are serially positioned relative to each other, in this instance, so that light is introduced first through the quarter wave retarder 28 and then through the linear polarizer 26. The linear polarizer may be of a conventional type such as that manufactured by Nitto Denko Corporation or variations thereof. Similarly, the quarter wave retarder 28 may be of a conventional type such as that manufactured by Nitto Denko Corporation or variations thereof.

The support substrate 30 at the back end of the circular polarizing assembly 24 is preferably formed of glass or plastic. If the Fresnel lens is thick enough, it may serve to also act as the support substrate, obviating the need for such a separate component.

A high power Fresnel lens 32 is positioned to receive output from the circular polarizing assembly 24. The Fresnel lens then nominally collimates (i.e. redirects light) such that the incident angle at the screen is at a much lower angle with respect to its surface normal. As a result, the brightness is uniform across the projection screen. As used herein the term "high power" refers to a case where the Fresnel facets are steep enough that the reflectivity of rays incident onto the Fresnel facets is appreciable, with reflected rays impinging onto the rear (piano) surface of the Fresnel lens at an angle (with respect to normal) sufficiently high that significant or total internal reflection (TIR) occurs at the piano surface, and the re-reflected rays then exit the lens physically displaced from the rays forming the primary image. Visible ghosts can be seen with Fresnel designs with f/4 or lower, while low profile projectors might require Fresnel lens designs at F/1 or less.

The integration of the circular polarizing assembly and the high power Fresnel lens is done using index-matched media, such as laminations, so that there are no significant reflections at any of the internal interfaces. In an optical sense, the rear surface of the Fresnel lens can thus be taken to mean the rear surface of the support substrate 30.

In operation, circularly polarized light 20 from the projection lens remains circularly polarized going through the cover glass 30 as indicated by arrow 34 and is introduced through the quarter wave retarder 28 which converts it to linearly polarized as shown by arrow 36. It then passes through the linear polarizer 26 which is oriented to pass this polarization state, as indicated by arrow 38. This primary image then passes through the Fresnel lens and the viewing screen without a change in orientation state.

The ghost image (shown by dashed line 40) reflected from the Fresnel facet 42 starts out as linearly polarized light (arrow 44) which goes through the linear polarizer 26 and maintains this polarization state (arrow 46). It becomes circularly polarized after going through the quarter wave retarder 28 as indicated by arrow 48. The next reflection of this light occurs on the rear surface 50 of the support substrate 30. The reflected light 52 remains circularly polarized but with opposite handedness (arrow 54). The re-reflected ghost ray 52 becomes linearly polarized (arrow 56) after going through the quarter wave retarder 28 but the orientation is orthogonal to the pass axis of the linear polarizer 26 which then quenches the ghost energy.

Figure 3:
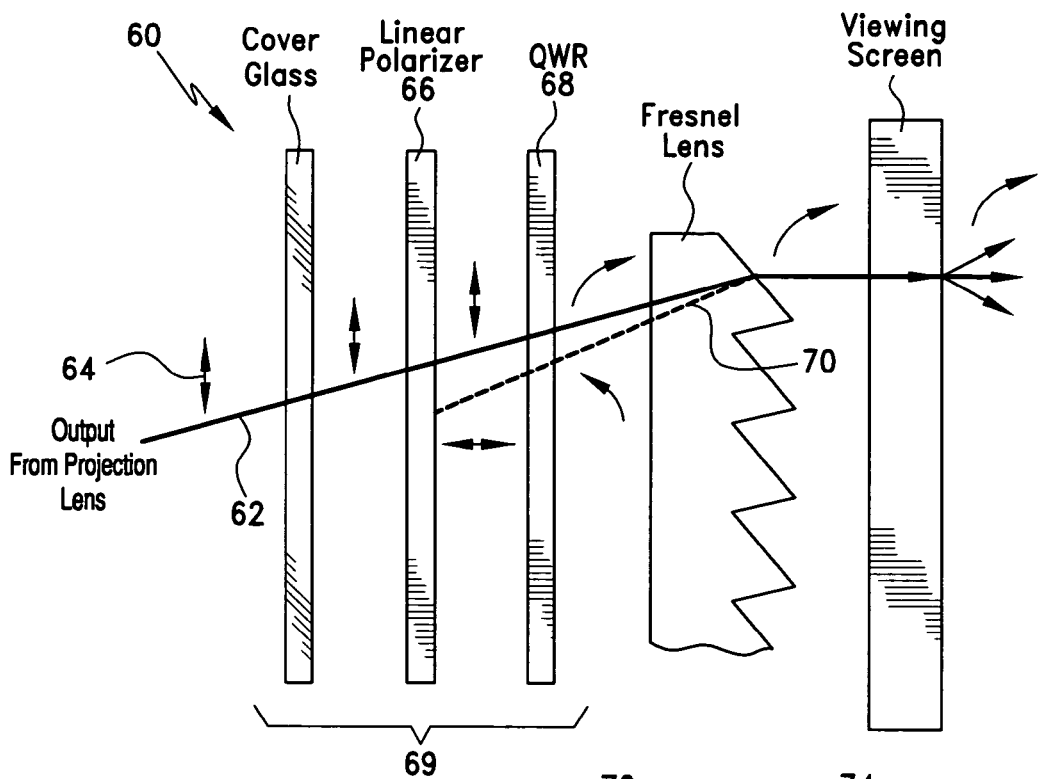
FIG. 3 is schematic illustration of a secondary image suppression system in accordance with a second embodiment of the present invention in which the output from the projection lens is linearly polarized.

Referring now to FIG. 3, a second embodiment of the secondary image suppression system of the present invention is illustrated, designated generally as 60, in which the output 62 from a projection lens (not shown) of a rear projection system is linearly polarized, as indicated by arrow 64. In this instance, the positions of the linear polarizer 66 and the quarter wave retarder 68 in the circular polarizing assembly 69 are reversed. Thus, in this instance, the ghost reflection 70 from the Fresnel lens changes handedness of its circular sense which is then linearly polarized going through quarter wave retarder 68. However, the linearly polarized ghost ray is now orthogonal to the pass axis of the linear polarizer 66 and is absorbed (i.e. suppressed).

Figure 4:
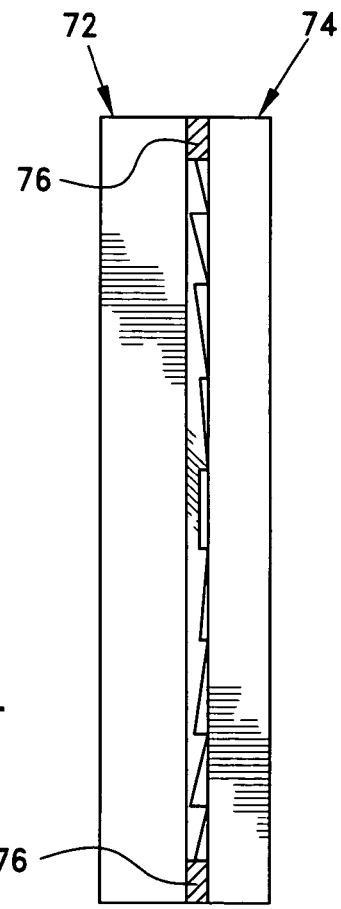
FIG. 4 shows a final assembly of the secondary image suppression system.

Referring now to FIG. 4, in actual implementation of the secondary image suppression system in any of the above-described embodiments, the support substrate, quarter wave retarder, linear polarizer and Fresnel lens are integrated as a sub-assembly 72 and this sub-assembly 72 is then bonded to the viewing screen 74 via a "picture" frame 76. An alternative approach to mounting would be to have sub-assembly 72 and viewing screen 74 in close proximity to one another by mechanical means. Yet another mounting approach would be to space sub-assembly 72 and viewing screen 74 apart. This is not prone to ghosting either since the ghost rays have already been suppressed by the circular polarizer.

Although not shown here the secondary image suppression system of the present invention can be utilized when light from the projection lens is unpolarized. In such an instance, roughly half of the incident light energy coming from the projection lens will be absorbed by the linear polarizer but the ghost suppression function would still work.

The optical center of the Fresnel lens may be offset from the physical center of the rear projection system. This may be advantageous when the observer is viewing the display from an offset position with respect to screen normal. Offsetting the Fresnel has the effect of "steering" the collimated input to the screen and thus offsetting the emission lobe principal axis to be more aligned with the observer's position, enhancing the display luminance as seen by the observer.

The secondary image suppression system of this invention can be extended to alleviate a problem associated with thin optical systems requiring short focal length Fresnel lenses with steep facets. This applies to any rear projection system using a Fresnel lens where the facets are steep enough to cause the ghost rays to undergo significant internal reflections within the Fresnel lens. Objectionable reflections might be seen with Fresnel lenses designed at F/4 or lower.

Figure 5:
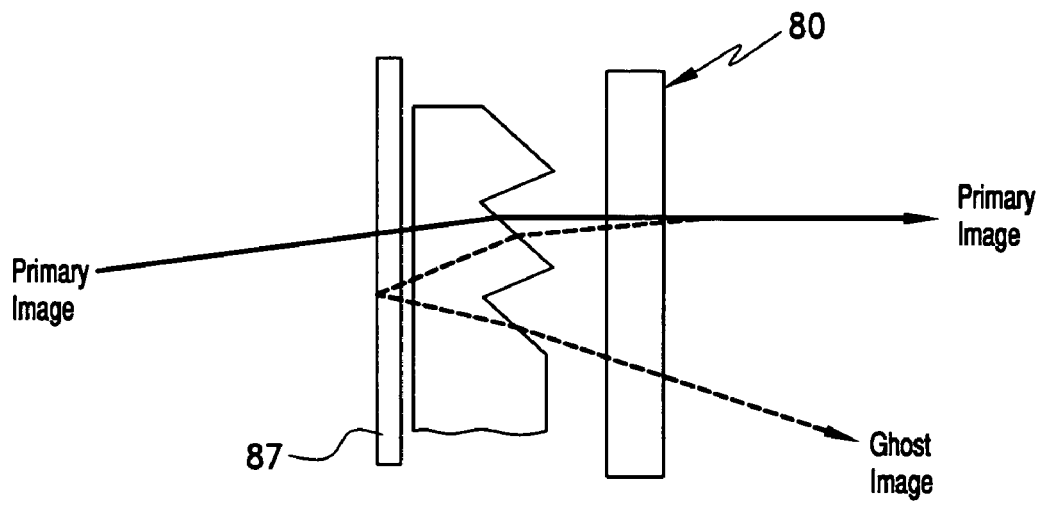
FIG. 5 (Prior Art) illustrates the problem with ghost images being generated with thin optical systems requiring short focal length Fresnel lenses with steep facets.

Referring now to FIG. 5 (Prior Art) it can be seen that ghost images can arise from reflections in the viewing screen 80 which are then re-reflected from the rear (piano) surface of the Fresnel lens or rear cover glass 87 (if the two are laminated/index-matched). These screen reflections can arise from the bulk of the screen or, in the case of surface diffusers, from the surfaces. Reflections from the screen front surface in particular, which is relatively far from the Fresnel lens piano surface, can produce ghost images significantly displaced from the primary image, and hence more distracting.

Figure 6:
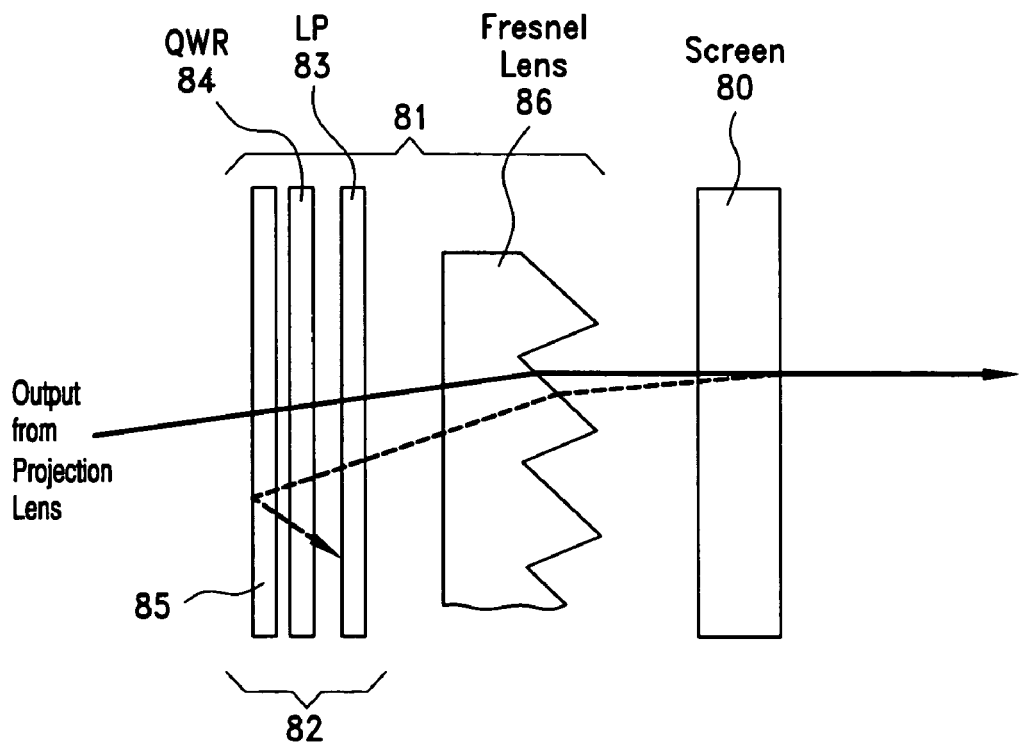
FIG. 6 illustrates how the secondary image suppression system may be used with such a thin optical system.

Referring now to FIG. 6, it can be seen that the SISS configuration described above is well-suited to eliminate ghost images from the viewing screen 80, as described in FIG. 5. In this example, a secondary image suppression system (SISS) 81 includes a SISS polarizing assembly 82 positioned to receive light from a rear projection system. The SISS polarizing assembly 82 includes a SISS linear polarizer 83 and a SISS quarter wave retarder 84. These are positioned on a support substrate 85. The support substrate 85, SISS quarter wave retarder 84, and SISS linear polarizer are serially positioned relative to each other and integrated with a Fresnel lens 86 using index-matching media so that there are no internal reflections.

Figure 7:
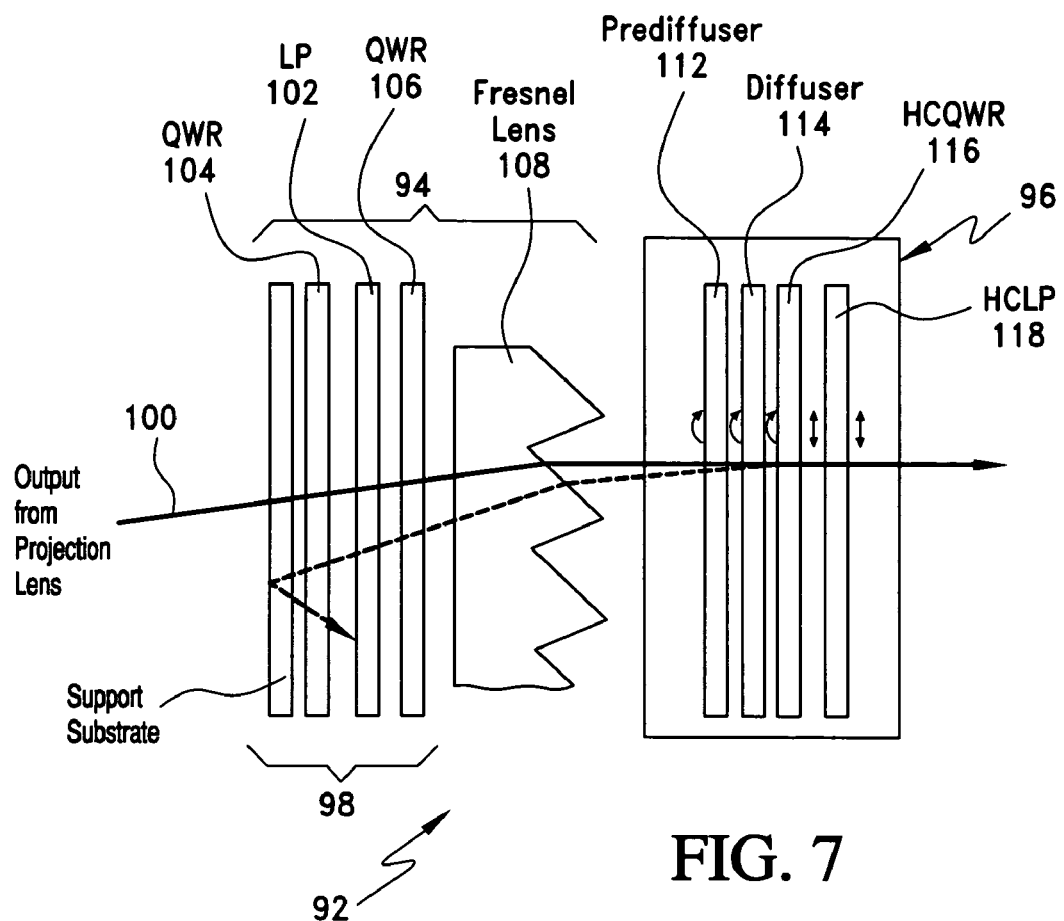
FIG. 7 is a schematic illustration of one embodiment of a high contrast screen assembly in accordance with this invention.

Referring now to FIG. 7, a high contrast screen assembly, designated generally as 92, is illustrated. High contrast screen assembly 92 includes a secondary image suppression system (SISS) 94 and a high contrast viewing screen assembly 96 operatively associated with the secondary image suppression system. The secondary image suppression system (SISS) 94 includes a SISS polarizing assembly 98 positioned to receive light 100 from a rear projection lens of a rear projection system. The SISS circular polarizing assembly 98 includes a SISS linear polarizer 102 and a first SISS quarter wave retarder 104. It also includes a second SISS quarter wave retarder 106. The first SISS quarter wave retarder SISS 104, the linear polarizer 102, and the second SISS quarter wave retarder 106 are serially positioned relative to each other and integrated with the Fresnel lens 108 using index-matching media so that there are no internal reflections. The SISS quarter wave retarder 106 is included to maximize throughput when used in combination with the circular polarizer which is part of the screen assembly 96. A high power Fresnel lens 108 is positioned to receive output from the SISS circular polarizing assembly 98. The secondary image suppression system (SISS) 94 operates in a similar manner as that discussed relative to the embodiments discussed above. During use, the light 100 from a projection lens of a rear projection system is introduced through the SISS polarizing assembly 98 and through the high power Fresnel lens 108, any significant secondary ghost images being eliminated by the circular polarizing assembly 98.

The high contrast viewing screen assembly 96 includes a holographic pre-diffuser 112 to receive the light output from the Fresnel lens 108. The pre-diffuser minimizes speckle. A holographic diffuser 114 receives light output from the holographic pre-diffuser 112. A high contrast quarter wave retarder HCQWR 116 receives light output from the holographic diffuser 114. The HCQWR 116 is orthogonally oriented relative to the second SISS quarter wave retarder 106. A high contrast linear polarizer (HCLP) 118 receives light output from the HCQWR 116.

During use, circularly polarized light from the Fresnel lens 108 is introduced to the pre-diffuser 112 for minimizing speckle, passed through the diffuser 114 which forms the desired viewing cone for an observer while preserving the polarization of the light, passed through the second HCQWR 116 for linearly polarizing the light, and passed through the HCLP 118 as it exits the high contrast screen assembly.

Figure 8:
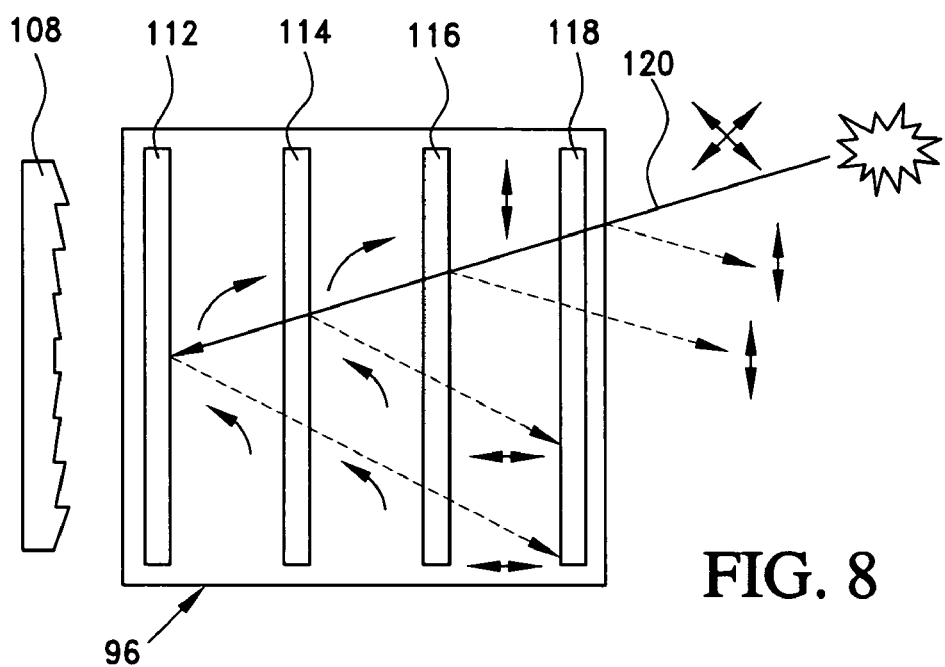
FIG. 8 illustrates ambient light management in the high contrast portion of the high contrast screen assembly of FIG. 7.

FIG. 8 shows the benefits of the invention in terms of its low reflectivity and high ambient contrast. Incident ambient light 120 is linearly polarized on first passing through the HCLP 118, then circularly polarized by the HCQWR 116. Upon partial reflection from the holographic diffuser 114 and the holographic pre-diffuser 112 the state of polarization is reversed. After passing back through the HCQWR 116, this light is converted back to linearly polarized light, but with its axis normal to that of the HCLP 118. It is thus effectively absorbed by the HCLP 118. In large measure the only reflected ambient is that from the front surfaces of the HCLP 118, which are mitigated by the use of conventional antireflective coatings.

In this way high ambient contrast is improved, while avoiding the image artifacts associated with structured screens.

Figure 9:
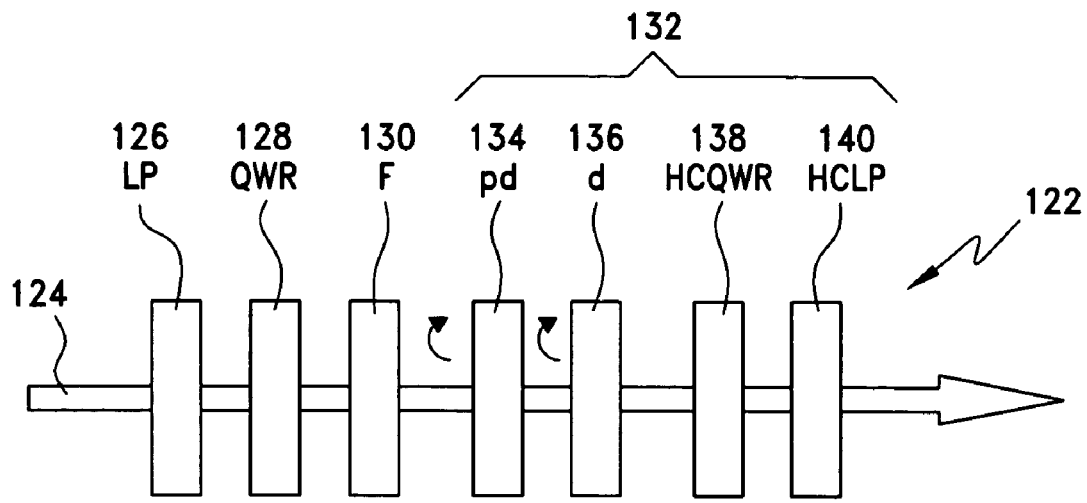
FIG. 9 is a schematic illustration of another embodiment of a high contrast screen assembly in accordance with this invention in which a linear polarizer and quarter wave retarder are placed on one side of the Fresnel lens; and, a quarter wave retarder and linear polarizer are placed on the other side of the Fresnel lens.

Referring now to FIG. 9, another embodiment of a high contrast screen assembly, designated generally as 122, is schematically illustrated. In this instance, light 124 is first introduced to an SISS linear polarizer 126 prior to being introduced to a SISS quarter wave retarder 128 and finally a Fresnel lens 130. The high contrast viewing screen assembly, designated generally as 132 includes a holographic pre-diffuser 134, holographic diffuser 136, high contrast quarter wave retarder (HCQWR) 138, and high contrast linear polarizer (HCLP) 140.

In this instance, circularly polarized light from the Fresnel lens 130 is introduced to the pre-diffuser 134 for minimizing speckle, passed through the diffuser 136 which forms the desired viewing cone for an observer while preserving the polarization of the light, passed through the HCQWR 138 for linearly polarizing the light, and passed through the HCLP 140 as it exits the high contrast screen assembly 132.

Incident ambient light is linearly polarized on first passing through the HCLP 140 and circularly polarized by the HCQWR 138. Upon partial reflection from the holographic diffuser 136 and the holographic pre-diffuser 134 the state of polarization is reversed and after passing back through the HCQWR 138 is converted back to linearly polarized light, but with its axis normal to that of the HCLP 140, thus being effectively absorbed by the HCLP 140. This configuration is best suited if output light 124 is linearly polarized coming out of the projection lens.

Figure 10:
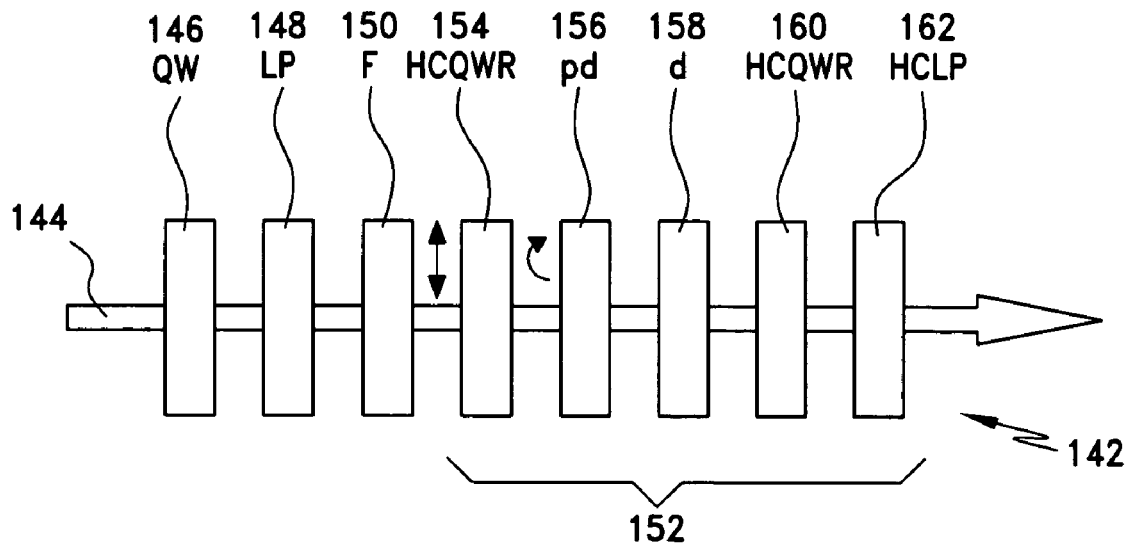
FIG. 10 is a schematic illustration of another embodiment of a high contrast screen assembly in accordance with this invention in which the positions of the quarter wave retarder and the linear polarizer are reversed; and, two quarter wave retarders are placed on the other side of the Fresnel lens along with a linear polarizer.

Referring now to FIG. 10, another embodiment of a high contrast screen assembly, designated generally as 142, is schematically illustrated. In this instance, light 144 is first introduced to SISS quarter wave retarder 146 prior to being introduced to a SISS linear polarizer 148 and finally a Fresnel lens 150. The high contrast viewing screen assembly, designated generally as 152, includes a first HCQWR 154, holographic pre-diffuser 156, holographic diffuser 158, second HCQWR 160, and HCLP 162.

In this instance, linearly polarized light from the Fresnel lens 150 is introduced to the first HCQWR 154 for conversion to circular polarization (maximizes system throughput in combination with circular polarizer comprising elements 160 and 162), introduced to the pre-diffuser 156 for minimizing speckle, passed through the diffuser 158 which forms the desired viewing cone for an observer while preserving the polarization of the light, passed through the second HCQWR 160 for linearly polarizing the light, and passed through the HCLP 162 as it exits the high contrast screen assembly 142.

Incident ambient light is linearly polarized on first passing through the HCLP 162 and circularly polarized by the second HCQWR 162. Upon partial reflection from the holographic diffuser 158 and the holographic pre-diffuser 156 the state of polarization is reversed and after passing back through the second HCQWR 160 is converted back to linearly polarized light, but with its axis normal to that of the HCLP 162, thus being effectively absorbed by the HCLP 162. This configuration is best suited if output light 144 is circularly polarized coming out of the projection lens.

Other embodiments and configurations may be devised without departing from the spirit of the invention and the scope of the appended claims. For example, the pre-diffuser and diffuser locations could be switched, only one diffuser may be utilized instead of two, two diffusers may be used on one substrate (i.e. on either side of the substrate), a front substrate can be used in front of the HCLP which could either be a, clear or dark (neutral density) glass or plastic, the front substrate could have an anti-reflective coating.

The invention claimed is:

1. A secondary image suppression system for minimizing secondary ghost images in a screen assembly for a rear projection system, comprising:
   a circular polarizing assembly positioned to receive light from a rear projection lens of a rear projection system, said circular polarizing assembly including a linear polarizer and a quarter wave retarder, said linear polarizer and said quarter wave retarder being serially positioned relative to each other; and,
   a high power Fresnel lens positioned to receive output from said circular polarizing assembly, said circular polarizing assembly and said high power Fresnel lens being integrated so as to be index-matched,
   wherein during use light from a projection lens of a rear projection system is introduced through said circular polarizing assembly and through said high power Fresnel lens toward a viewing screen, any significant secondary ghost images being eliminated by said circular polarizing assembly.

2. The system of claim 1, wherein said light from said projection lens is circularly polarized, said linear polarizer and said circular polarizing element being serially positioned wherein during use said light from said projection lens is introduced first through said quarter wave retarder and then through said linear polarizer, any significant secondary ghost images being eliminated by said linear polarizer after being re-reflected toward said Fresnel lens from a back surface of said circular polarizing assembly and directed through said quarter wave retarder.

3. The system of claim 1, wherein said light from said projection lens is linearly polarized, said linear polarizer and said circular polarizing element being serially positioned wherein during use said light from said projection lens is introduced first through said linear polarizer and then through said quarter wave retarder, any significant secondary ghost images being eliminated by said linear polarizer after being generated from said Fresnel lens and directed back through said quarter wave retarder.

4. The system of claim 1, wherein said light from said projection lens is unpolarized.

5. The system of claim 1, wherein said circular polarizing assembly comprises a support substrate at a back end thereof; This support substrate may include an anti-reflective coating, if needed.

6. The system of claim 1, wherein said high power Fresnel lens has f/# less than F/4.

7. The system of claim 1, wherein said high power Fresnel lens has f/# in a range less than F/1.

8. The system of claim 1, wherein said circular polarizing assembly and said high power Fresnel lens are integrated using index-matched media.

9. The system of claim 1, wherein an optical center of said Fresnel lens is offset from a physical center of the rear projection system.

10. A screen assembly for a rear projection system, comprising:
    a secondary image suppression system, comprising:
    a circular polarizing assembly positioned to receive light from a rear projection lens of a rear projection system, said circular polarizing assembly including a linear polarizer and a quarter wave retarder, said linear polarizer and said quarter wave retarder being serially positioned relative to each other; and,
    a high power Fresnel lens positioned to receive output from said circular polarizing assembly, said circular polarizing assembly and said high power Fresnel lens being integrated so as to be index-matched; and,
    a viewing screen operatively associated with said secondary image suppression system,
    wherein during use light from a projection lens of a rear projection system is introduced through said circular polarizing assembly and through said high power Fresnel lens toward said viewing screen, any significant secondary ghost images being eliminated by said circular polarizing assembly.

11. The system of claim 10, wherein said high power Fresnel lens has f/# less than F/4.

12. The system of claim 10, wherein said high power Fresnel lens has f/# in a range less than F/1.

13. The system of claim 10, wherein said circular polarizing assembly and said high power Fresnel lens are integrated using index-matched media.

14. The system of claim 10, wherein an optical center of said Fresnel lens is offset from a physical center of the rear projection system.

15. The screen assembly of claim 10, wherein said secondary image suppression system is laminated together to form a subassembly that is bonded to said viewing screen via a frame assembly.

16. A high contrast screen assembly for a rear projection system, comprising:
    a secondary image suppression system (SISS), comprising:
    a SISS polarizing assembly positioned to receive light from a rear projection system and to transmit circularly polarized light, said SISS polarizing assembly including a first SISS quarter wave retarder, an SISS linear polarizer and a second SISS quarter wave retarder, said first SISS quarter wave retarder, said SISS linear polarizer and said second SISS quarter wave retarder being serially positioned relative to each other; and,
    a high power Fresnel lens positioned to receive output from said SISS polarizing assembly, said SISS polarizing assembly and said high power Fresnel lens being integrated so as to be index-matched,
    wherein during use light from a projection lens of a rear projection system is introduced through said SISS polarizing assembly and through said high power Fresnel lens, any significant secondary ghost images being eliminated by said polarizing assembly; and,
    a high contrast viewing screen assembly operatively associated with said secondary image suppression system, comprising:
    a holographic pre-diffuser for receiving the light output from said high power Fresnel lens, said pre-diffuser for minimizing speckle;
    a holographic diffuser for receiving light output from said holographic pre-diffuser;
    a high contrast quarter wave retarder (HCQWR) for receiving light output from said holographic diffuser; and,
    a high contrast linear polarizer (HCLP) for receiving light output from said HCQWR,
    wherein during use:

1) circularly polarized light from said Fresnel lens is introduced to said pre-diffuser for minimizing speckle, passed through said diffuser which forms the desired viewing cone for an observer while preserving the polarization of the light, passed through said HCQWR for linearly polarizing the light, and passed through said HCLP as it exits the high contrast screen assembly; and, 2) incident ambient light is linearly polarized on first passing through said HCLP, circularly polarized by said HCQWR, and upon partial reflection from said holographic diffuser and said holographic pre-diffuser the state of polarization is reversed and after passing back through said HCQWR is converted back to linearly polarized light, but with its axis normal to that of said HCLP, thus being effectively absorbed by said HCLP.

17. The high contrast screen assembly of claim 16, wherein a front surface of said HCLP includes an antireflective coating.

18. A high contrast screen assembly for a rear projection system, comprising:
   a secondary image suppression system (SISS), comprising:
      a SISS polarizing assembly positioned to receive light from a rear projection system, said SISS polarizing assembly including an SISS linear polarizer and a SISS quarter wave retarder, said SISS linear polarizer and said SISS quarter wave retarder being serially positioned relative to each other such that light from said rear projection system is first introduced to said SISS linear polarizer prior to being introduced to said SISS quarter wave retarder; and;
      a high power Fresnel lens positioned to receive output from said SISS polarizing assembly, said SISS polarizing assembly and said high power Fresnel lens being integrated so as to be index-matched,
      wherein during use light from a projection lens of a rear projection system is introduced through said SISS polarizing assembly and through said high power Fresnel lens, any significant secondary ghost images being eliminated by said polarizing assembly; and,
   a high contrast viewing screen assembly operatively associated with said secondary image suppression system, comprising:
      a holographic pre-diffuser for receiving the light output from said high power Fresnel lens, said pre-diffuser for minimizing speckle;
      a holographic diffuser for receiving light output from said holographic pre-diffuser;
      a high contrast quarter wave retarder (HCQWR) for receiving light output from said holographic diffuser, and,
      a high contrast linear polarizer (HCLP) for receiving light output from said HCQWR,
      wherein during use:
         1) circularly polarized light from said Fresnel lens is introduced to said pre-diffuser for minimizing speckle, passed through said diffuser which forms the desired viewing cone for an observer while preserving the polarization of the light, passed through said HCQWR for linearly polarizing the light, and passed through said HCLP as it exits the high contrast screen assembly; and,
         2) incident ambient light is linearly polarized on first passing through said HCLP, circularly polarized by said HCQWR, and upon partial reflection from said holographic diffuser and said holographic pre-diffuser the state of polarization is reversed and after passing back through said HCQWR is converted back to linearly polarized light, but with its axis normal to that of said HCLP, thus being effectively absorbed by said HCLP.

19. A high contrast screen assembly for a rear projection system, comprising:
   a secondary image suppression system (SISS), comprising:
      a SISS polarizing assembly positioned to receive light from a rear projection system, said SISS polarizing assembly including a SISS quarter wave retarder and a SISS linear polarizer, said SISS linear polarizer and said SISS quarter wave retarder being serially positioned relative to each other; and;
      a high power Fresnel lens positioned to receive output from said SISS polarizing assembly, said SISS polarizing assembly and said high power Fresnel lens being integrated so as to be index-matched,
      wherein during use light from a projection lens of a rear projection system is introduced through said SISS polarizing assembly and through said high power Fresnel lens, any significant secondary ghost images being eliminated by said polarizing assembly; and,
   a high contrast viewing screen assembly operatively associated with said secondary image suppression system, comprising:
      a first high contrast quarter wave retarder (HCQWR);
      a holographic pre-diffuser for receiving the light output from said first first high contrast quarter wave retarder (HCQWR), said pre-diffuser for minimizing speckle;
      a holographic diffuser for receiving light output from said holographic pre-diffuser;
      a second HCQWR for receiving light output from said holographic diffuser, said second HCQWR being orthogonally oriented relative to said first HCQWR; and,
      a high contrast linear polarizer (HCLP) for receiving light output from said HCQWR,
      wherein during use:
         1) linearly polarized light from said Fresnel lens is introduced to said first HCQWR for conversion to circular polarization, introduced to said pre-diffuser for minimizing speckle, passed through said diffuser which forms the desired viewing cone for an observer while preserving the polarization of the light, passed through said second HCQWR for linearly polarizing the light, and passed through said HCLP as it exits the high contrast screen assembly; and,
         2) incident ambient light is linearly polarized on first passing through said HCLP, circularly polarized by said second HCQWR, and upon partial reflection from said holographic diffuser and said holographic pre-diffuser the state of polarization is reversed and after passing back through said second HCQWR is converted back to linearly polarized light, but with its axis normal to that of said HCLP, thus being effectively absorbed by said HCLP.

* * * * *